United States Patent

[11] 3,618,008

[72] Inventor Neil C. Kern
 Scottsdale, Ariz.
[21] Appl. No. 885,182
[22] Filed Dec. 15, 1969
[45] Patented Nov. 2, 1971
[73] Assignee Motorola, Inc.
 Franklin Park, Ill.

[54] ANTIGLINT RADIO DIRECTION FINDER
 5 Claims, 1 Drawing Fig.
[52] U.S. Cl. .................................................... 343/7.3,
  343/16 R
[51] Int. Cl. ...................................................... G01s 9/02,
  G01s 9/14
[50] Field of Search ............................................ 343/7.3, 16,
  115, 118

[56] References Cited
 UNITED STATES PATENTS
 2,999,236  9/1961  Lewinter ....................... 343/118

3,141,163  7/1964  Parode et al. .................. 343/7.3

*Primary Examiner*—Malcolm F. Hubler
*Attorney*—Mueller & Aichele

ABSTRACT: In radio direction finders of the type in which the direction of propogation of a pulse reflected from a target is indicated, errors occur due to glint. The glint is due to the fact that all reflective parts of the target are not at the same distance from the direction finder whereby the several radio echoes reflected from the same target arrive at the direction finder at different times and are vectorially added in the direction finder, causing incorrect indication of the direction to the target by the direction finder. The various errors of direction, due to glint, measured by direction finders is averaged out by applying a variable range gate to the waves received by the direction finder, whereby angle reflection measurements from various parts of the target are averaged out to give a true indication of direction of the target.

PATENTED NOV 2 1971 3,618,008
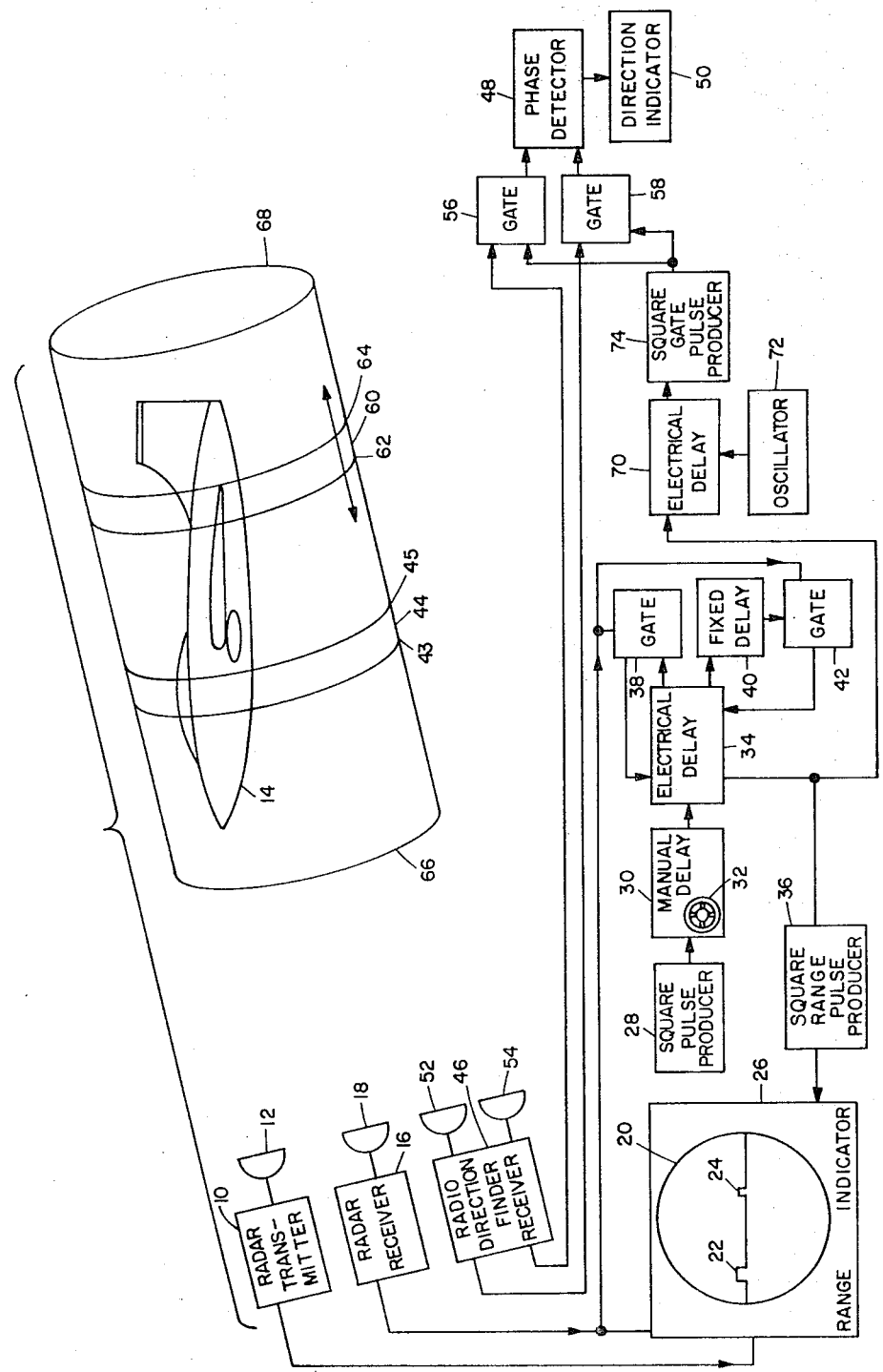
INVENTOR.
Neil C. Kern
BY
Mueller, Aichele & Rauner
ATTY'S

ANTIGLINT RADIO DIRECTION FINDER

BACKGROUND

This invention relates to pulsed radio direction finders of the type in which radiofrequency energy is directed in the general direction of the target and the direction of the wave reflected from the target is indicated by a direction finder.

All reflecting parts of a target are not at the same distance from the direction finder. For example, if the target is an airplane, there is practically no flat surface thereof. There is a substantial difference in distance between the various points on the plane including various parts of the fuselage, of the nose of the plane, of its wings and of its tail, for example. When a radar wave hits the plane and is reflected therefrom towards a direction finder, the several reflected waves from the plane get back to the radio direction finder at various times. The radio direction finder may comprise two antennas which point in the same direction, both antennas receiving the reflected waves. The radio direction finder indicates the direction of the target by measuring the phase difference between the various parts of the wave front of the reflected wave from the target which arrive at the two antennas. Due to the fact that the returned wave front is the vector sum of all the reflections from the various parts of the target, the wave front is very complicated and for a moving target, continuously varying. These angular variations are normally very slow and therefore cannot be averaged to find the true mean. Because of the multiple reradiators, the direction finder indicates a direction to the target that is almost never the true direction thereof, even though the average of all the directions indicated by the direction finder will be very nearly the true direction to the target. The error in indicating the direction due to reflection from various parts of the target is called "glint." The glint effect may become particularly great if the target includes a plurality of targets which are relatively close together. In such a case, the indicated direction may be away from all the targets instead of at the center point thereof.

When a pulse-type radar is used, a known method for averaging out the glint effect is to vary the frequency of the radiofrequency wave comprising the transmitted pulse. The radiofrequency comprising successive pulses is varied over a wide enough band to cause the received reflection to give independent directional data after each transmitted pulse. Since many pulses are transmitted each second, the response of the radio direction finder is the average of the directional data received after each transmitted pulse and the glint error to a great extent is averaged out due to the fact that with great enough change of radiofrequency of the successive pulses, the received reflections give independent directional data. However, oscillators capable of the broad tuning needed for such operation of a pulse-type radio transmitter do not provide stable reference waves for coherent reception of the reflected waves.

It is an object of this invention to provide an improved radio direction finder of the reflected wave type.

It is another object of this invention to provide a radio direction finder of the reflected wave type in which the radiofrequency of the transmitted pulse is unvarying and yet one in which errors of directional indication are greatly reduced or substantially eliminated.

SUMMARY

In accordance with this invention, a range gate is applied to the radio direction finder. This range gate is narrow with respect to the length of the target in a direction away from the direction finder, that is, in the range direction, and is cyclically variable in position to scan at least the total length of the target in the range direction. The range gate goes through a series of cycles quickly whereby the different phase relationships detected by the direction finder are averaged and the direction finder indicates the average phase relation of the wave fronts received by it and therefore the radio direction finder indicates the true direction to the target.

DESCRIPTION

The invention will be better understood upon reading the following description in connection with the accompanying drawing, the single FIGURE of which illustrates a system including an embodiment of this invention.

A radar transmitter 10, having a directional antenna 12, sends out a pulse of radiofrequency waves. These waves hit the target 14 and the reflected waves are received by the radio receiver 16 having a directional antenna 18. The direction of the two antennas 12 and 18 may be parallel. The transmitted pulse, properly attenuated, is applied to a radar scope 20 and an indication 22 appears on the face of the scope 20. The received pulse, properly amplified, is applied to the scope 20 and the indication 24 appears on the face thereof. The linear distance on the scope 20 between the pulses 22 and 24 is a measure of the distance to the target 14. It is usually important to indicate the distance to the target 14 without distraction by other targets. A range gate is therefore applied to the range indicator 26 which prevents any indication on the scope 20 except the main or transmitted pulse 22 and the received pulse 24 which is reflected from the target 14. Since the distance to the target 14 may be changing continuously, the position of the range gate must also change continuously. One manner of producing a range gate which follows a particular target is as follows:

A square range pulse is produced by a square pulse producer 28. The range pulse produced by the pulse producer 28 (which is synchronized with the transmitted pulse) is applied to a manual delay means 30 having a manual delay adjustment 32. The delayed range pulse output of the manual delay means 30 is applied to an electrical delay circuit 34. The delay means 34 applies a range pulse whose delay is controllable to a square range pulse producer 36 and to a gate circuit 38 and also to a fixed delay circuit 40. The output of the fixed delay circuit 40 is applied to a gate circuit 42. The fixed delay of the fixed delay circuit 40 is such that the range pulses appearing in the gate circuits 38 and 42 are contiguous in time, that is, as the pulse appearing in the gate 38 due to delay circuit 34 ceases, the pulse appearing in the gate circuit 42 begins. All the received distance-indicating pulses, including the reflection from the target 14, are applied to both gates 38 and 42. When the distance pulse received from the target 14 coincides with the range pulse applied to the gate 38 by the delay means 34, the delay of the delay circuit 34 is increased. When the distance pulse received from the target 14 coincides with the range pulse applied to the gate 42 by the delay means 40, the delay of the delay means 34 is decreased. The result is that the distance pulse received from the target 14 comes evenly between the range pulses appearing in the gates 38 and 42 and the delay produced by the delay circuit 34 is varied continuously as the distance to the target varies. As noted above, a range pulse is also applied by the delay circuit 34 to the square range pulse producer 36, which may square the pulse applied to it and shorten it if desired. The range pulse squarer 36 applies a gating or ranging pulse to the range indicator 26 which permits only the reflected distance pulse 24 from the target 14 to appear on the radar scope face 20. The target 14 is chosen by rotating the wheel 32 manually until the received distance pulse 24 from the target 14 is shown on the scope. Thereafter, by automatic action of the described automatic range gate device, only this pulse 24 appears on the scope face. The distance corresponding to the width of the range gate appearing at the output of the square pulse producer 36 is indicated by the distance 44 between the two rings 43 and 45 on the target 14.

The direction of the target from the position of the radar installation is indicated by the radio direction finding apparatus which includes normally a radio direction finding receiver 46 and phase detector 48 and a direction indicator 50. As noted above, if the usual or known radio direction finder is used, due to the reflection from various areas on the target that are at various distances and angles from the receiver 46, that is, due to the glint, the wave front that arrives at the antennas 52 and 54 of the receiver 46 is very complicated and varies in a manner determined by the instantaneous small vectorial sum of the various reflections received by the receiver 46 and the indicator 50 indicates a direction to the target that varies from one extreme edge thereof to the other and beyond, and is very seldom the true direction to the center of the target 14. In accordance with this invention, the glint rate is increased to allow more time for the angular errors to be averaged out to indicate the true direction to the center of the target 14. This is accomplished by detecting the direction to a small portion or sample of the target 14 and by varying the selected sample of the target over the length thereof in the range direction at a high rate of speed while continuing to detect the direction, to average, and indicate the average of the various detected directions. This is accomplished as shown in the FIGURE. The output from the antennas 52 and 54, instead of going directly to the phase detector 48, goes to respective gate circuits 56 and 58, and the output of the gate circuits 56 and 58 is fed to the phase detector 48. The instantaneous output of the phase detector 48 is a measure of the direction of the target as indicated by the reflections received from the zone 60, which has a length equal to the distance between the rings 62 and 64. This zone 60 is varied in position between two extreme positions such as the two rings 66 and 68, however, the length of the zone 60 is not changed. In this manner, all possible reflective points on the target are scanned in the range direction. For this purpose, the range-controlled output of the delay circuit 34 is applied to another electrical delay circuit 70. The delay produced by the delay circuit 70 is varied by an oscillator 72. The output of the delay 70 may then be squared if necessary by a pulse-squaring circuit 74. The position of the square pulse produced by the squaring circuit 74 varies between the two circles 66 and 68 at a speed determined by the frequency of the oscillator 72, and the distance between the circles 66 and 68 is determined by the amplitude of the oscillations produced by the oscillator 72. However, the center of the range of variations in position of the pulse produced by the squaring circuit 74 is at about the center of the target 14 in a range direction. Therefore, the zone 60 scans the target 14 in a range direction at twice the frequency of the oscillator 72. The frequency of the oscillator 72 is great enough so that the direction indicator 50 acts to average out the continuously changing directions fed to it from the phase detector 48 and gives a true indication of direction to the center of the target 14.

The here-disclosed range pulse producer is merely illustrative. Any known range pulse device may be provided instead thereof to produce the range pulse applied to the here-disclosed variable range gated glint-reducing direction finder.

The here-disclosed direction finder having two antennas is also illustrative. A single-antenna direction finder may be used instead of the disclosed two-antenna direction finder.

What is claimed is:

1. A glint-reducing radio direction finder comprising means to detect the direction of a target as indicated by a short portion thereof in the range direction
    means to vary said short portion in position in the range direction to scan at least a large portion of said target and
    means to average the indications of direction as detected for the short portion over the scanned portion of said target whereby a true reading of the direction of said target is provided.
2. The invention of claim 1 in which said means to detect the direction of a target comprises a radio receiver having a pair of antennas and means to measure the difference in phase of waves received by said two antennas.
3. The invention of claim 2 in which gating means are included between said receiver and said phase-measuring means.
4. The invention of claim 3 in which a range tracker is provided and range information is fed from said range tracker to said gating means.
5. The invention of claim 4 in which means are provided to vary the range of information fed out of the gating means cyclically with respect to the range information provided by said range tracker.

* * * * *